US012654332B2

(12) United States Patent
Bocamazo et al.

(10) Patent No.: US 12,654,332 B2
(45) Date of Patent: Jun. 16, 2026

(54) NEURAL NETWORKS TO IDENTIFY OBJECTS WITH STRUCTURED IDENTIFIERS

(71) Applicant: Amazon Technologies, Inc., Seattle, WA (US)

(72) Inventors: Michael Robert Bocamazo, Framingham, MA (US); Yuxuan Chen, Toronto (CA); Seyed Pourya Hoseini Alinodehi, Medfield, MA (US); Siyao Hu, Grafton, MA (US); Frank Preiswerk, Brooklyn, NY (US)

(73) Assignee: Amazon Technologies, Inc., Seattle, WA (US)

( * ) Notice: Subject to any disclaimer, the term of this patent is extended or adjusted under 35 U.S.C. 154(b) by 65 days.

(21) Appl. No.: 18/741,535

(22) Filed: Jun. 12, 2024

(65) Prior Publication Data

US 2025/0381675 A1 Dec. 18, 2025

(51) Int. Cl.
| | |
|---|---|
| *B25J 9/16* | (2006.01) |
| *G06K 7/14* | (2006.01) |
| *G06N 3/08* | (2023.01) |

(52) U.S. Cl.
CPC .......... B25J 9/1697 (2013.01); B25J 9/1679 (2013.01); G06K 7/1413 (2013.01); G06K 7/1417 (2013.01); G06N 3/08 (2013.01)

(58) Field of Classification Search
CPC ..... B25J 9/1697; B25J 9/1679; G06K 7/1413; G06K 7/1417; G06N 3/08
See application file for complete search history.

(56) References Cited

U.S. PATENT DOCUMENTS

| | | | | |
|---|---|---|---|---|
| 9,196,219 | B1* | 11/2015 | Zhou | G09G 5/06 |
| 10,296,602 | B1* | 5/2019 | Cooper | G06F 16/5866 |
| 10,981,272 | B1* | 4/2021 | Nagarajan | B25J 9/1669 |
| 11,350,024 | B1* | 5/2022 | Stallman | H04N 23/64 |
| 11,748,445 | B1* | 9/2023 | Sommer | G06F 18/213 |
| | | | | 382/201 |
| 11,893,786 | B1 | 2/2024 | Preiswerk et al. | |
| 12,288,294 | B2* | 4/2025 | Singh | G06T 17/10 |
| 2015/0054930 | A1* | 2/2015 | Bangera | G06V 20/693 |
| | | | | 348/77 |
| 2019/0168392 | A1* | 6/2019 | Väin | G06Q 10/00 |
| 2021/0409648 | A1* | 12/2021 | Kallakuri | G06T 7/70 |
| 2022/0032463 | A1* | 2/2022 | Schneider | B25J 9/1697 |
| 2022/0044441 | A1* | 2/2022 | Kalra | G06V 10/82 |
| 2022/0284609 | A1* | 9/2022 | Shree | G06T 7/33 |
| 2023/0177391 | A1* | 6/2023 | Packwood | G06N 3/092 |
| | | | | 706/12 |
| 2023/0286019 | A1* | 9/2023 | Ryan | B07C 3/082 |

(Continued)

*Primary Examiner* — Sohana Tanju Khayer

(74) *Attorney, Agent, or Firm* — Davis Wright Tremaine LLP

(57) ABSTRACT

Systems and methods are disclosed for identifying manipulated items using neural networks. Systems generate, using a first neural network, indications of an object of interest from the two or more objects in one or more images. Systems identify, using a second neural network, structured identifiers based, at least in part, the one or more images. Then, the system selects a structured identifier associated with the object of interest from the structured identifiers based, at least in part, on the indications to the object of interest.

20 Claims, 10 Drawing Sheets

(56) References Cited

U.S. PATENT DOCUMENTS

| | | | | |
|---|---|---|---|---|
| 2023/0326005 A1* | 10/2023 | Beggel | ................... | G06T 7/194 |
| | | | | 382/141 |
| 2024/0051146 A1* | 2/2024 | Luan | ....................... | B25J 9/163 |
| 2024/0161325 A1* | 5/2024 | Verstraete | ............. | G06V 10/82 |
| 2024/0169563 A1* | 5/2024 | Wen | .......................... | G06T 7/11 |
| 2024/0221166 A1* | 7/2024 | Yu | ............................ | G06T 7/11 |
| 2024/0221335 A1* | 7/2024 | Pauly | ..................... | G06T 19/20 |
| 2024/0281997 A1* | 8/2024 | Bharathwaj | ........... | G06V 10/44 |
| 2024/0316779 A1* | 9/2024 | Kanemoto | ............ | B25J 9/1687 |
| 2024/0331247 A1* | 10/2024 | Smith | .................... | G06T 13/40 |
| 2024/0386586 A1* | 11/2024 | Degirmenci | ............. | G06T 7/50 |
| 2024/0394889 A1* | 11/2024 | Zhang | ...................... | G06T 7/13 |
| 2024/0399587 A1* | 12/2024 | Rudy | ..................... | B25J 9/1697 |
| 2025/0037025 A1* | 1/2025 | Qualmann | ......... | G05B 19/4155 |
| 2025/0078361 A1* | 3/2025 | Narayana | ............... | G06T 11/60 |
| 2025/0104212 A1* | 3/2025 | Sawa | ........................ | G06T 7/70 |
| 2025/0131572 A1* | 4/2025 | Rim | ...................... | G06T 7/0002 |
| 2025/0139771 A1* | 5/2025 | Mo | ........................... | G06T 7/10 |
| 2025/0148610 A1* | 5/2025 | Zhu | ..................... | G06V 10/764 |
| 2025/0245964 A1* | 7/2025 | Kuen | ....................... | G06T 7/10 |

* cited by examiner

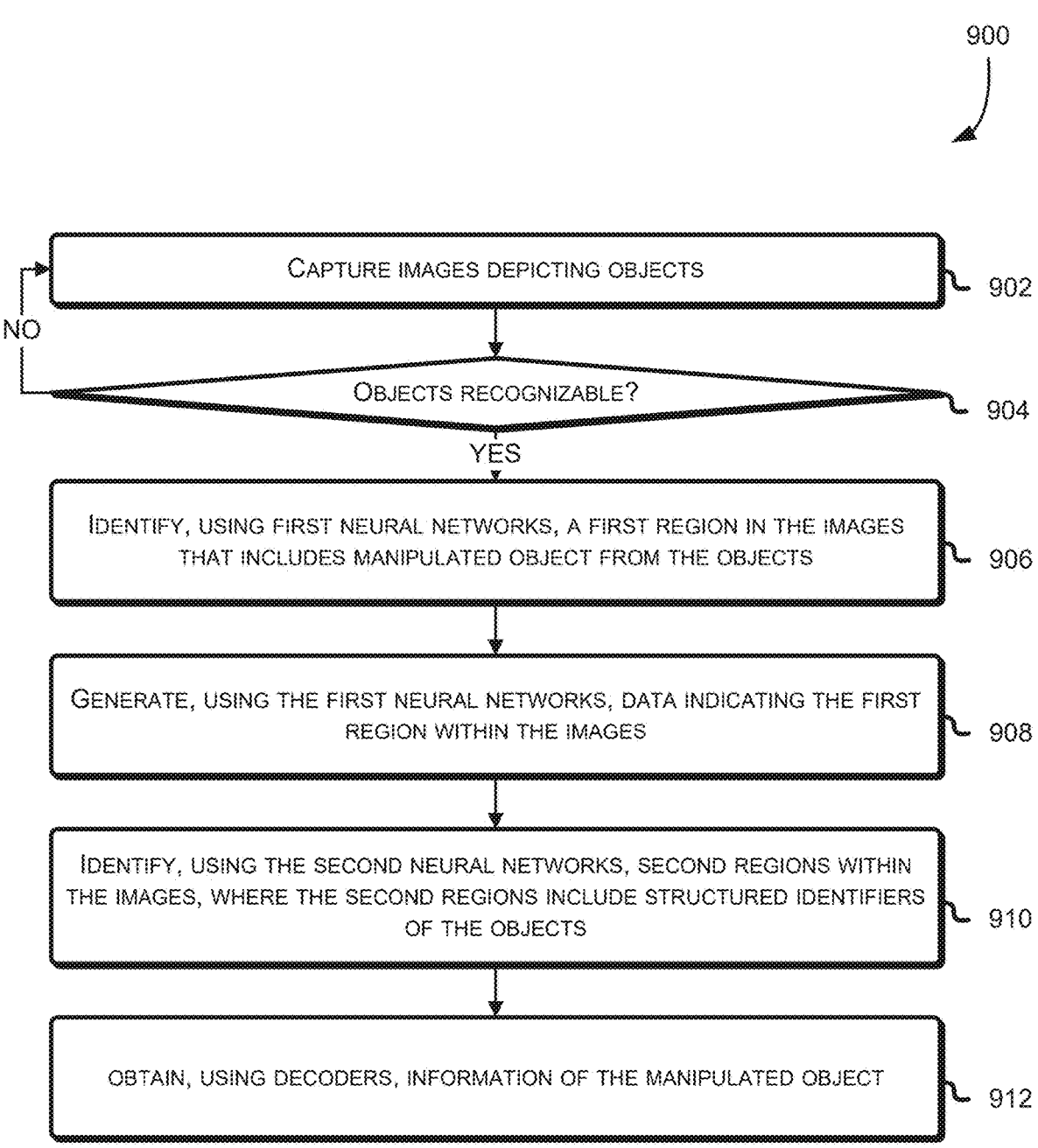

900

CAPTURE IMAGES DEPICTING OBJECTS — 902

NO

OBJECTS RECOGNIZABLE? — 904

YES

IDENTIFY, USING FIRST NEURAL NETWORKS, A FIRST REGION IN THE IMAGES THAT INCLUDES MANIPULATED OBJECT FROM THE OBJECTS — 906

GENERATE, USING THE FIRST NEURAL NETWORKS, DATA INDICATING THE FIRST REGION WITHIN THE IMAGES — 908

IDENTIFY, USING THE SECOND NEURAL NETWORKS, SECOND REGIONS WITHIN THE IMAGES, WHERE THE SECOND REGIONS INCLUDE STRUCTURED IDENTIFIERS OF THE OBJECTS — 910

OBTAIN, USING DECODERS, INFORMATION OF THE MANIPULATED OBJECT — 912

FIG. 9

NEURAL NETWORKS TO IDENTIFY OBJECTS WITH STRUCTURED IDENTIFIERS

BACKGROUND

Systems in fulfillment centers use neural networks and cameras to scan structured identifiers, such as barcodes, for monitoring inventory. However, these systems often receive images containing multiple items, each bearing a unique structured identifier. Due to the presence of numerous distinct identifiers, the system may struggle to determine which identifier to process from an image. Consequently, each item must be individually presented in front of a scan zone for accurate processing of the objects. The requirement for separate presentations of each object leads to increased operational costs and time inefficiencies. This includes the labor and time spent on robotically picking and positioning each item correctly in the camera's field of view. Such constraints significantly slow down the workflow performed by computer systems, particularly in high-volume environments like fulfillment centers, where speed and efficiency are crucial.

BRIEF DESCRIPTION OF THE DRAWINGS

Various techniques will be described with reference to the drawings, in which:

FIG. 9 illustrates another example process to scan structured identifier by identifying manipulated objects, according to at least one embodiment.

DETAILED DESCRIPTION

Figure 1:
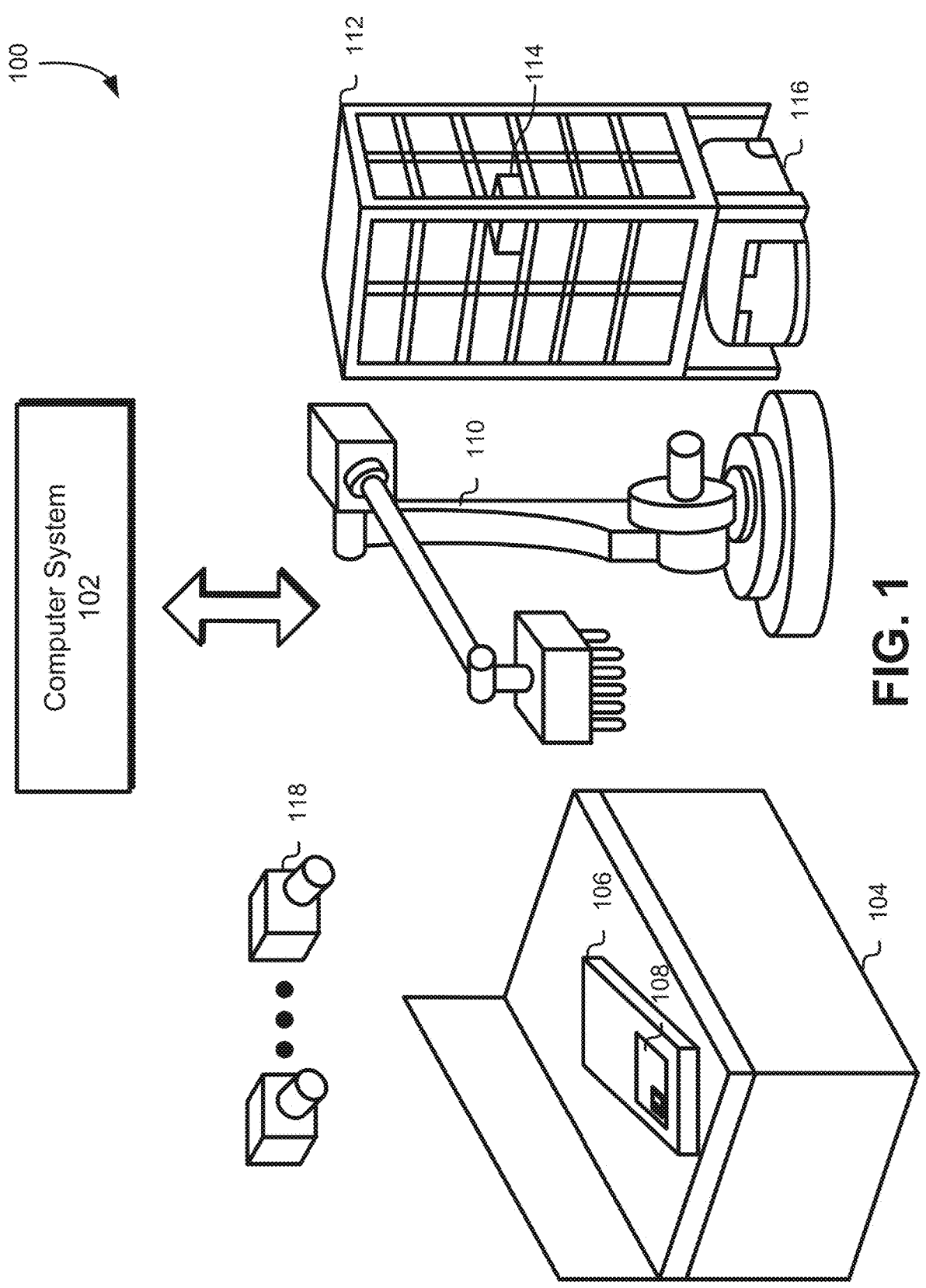
FIG. 1 illustrates an example system for storing items, according to at least one embodiment.

Systems and methods are described herein for manipulated item or object detection using artificial intelligence (e.g., neural networks, machine learning). A facility (e.g., shipping warehouse, fulfillment center, etc.) can perform tasks such as sorting items, packaging items, unpackaging items, picking items, shipping items, storing items, and the like. As an example, an item may be retrieved from storage and transported to a location in preparation for stowing in a container. In another example, an item can be retrieved or picked from a container in preparation for shipping. For some tasks, the facility can use a computer-vision system to process data received from camera-based (or image-based)

barcode reader or scanner in the facility. For example, the computer system can use the camera-based barcode reader to detect and read structured identifiers (e.g., one-dimensional (1D) barcodes such as linear barcodes, two-dimensional (2D) barcodes such as QR codes, other 2D codes such as DataMatrix code, PDF417, or Aztec code, or other dimensional bar codes such as 3D bar codes also known as Bumpy Barcodes) on various items in the facility. The structured identifier on an item may include identifying information for the item, target location information for the item, item attributes, etc. Structured identifiers (e.g., barcodes) can be applied to items using different types of labels (also referred to as label stickers, shipping labels, etc.), such as Scan Label Apply Manifest (SLAM) labels, Fulfillment Network Stock Keeping Unit (FNSKU) labels, etc.

Systems described herein enable identification of structured identifiers without having the item or object explicitly or deliberately presented to an optical scanner (e.g., barcode reader, camera, etc.). For example, a worker or a robotic arm in a warehouse does not need to present the item to a scanner by moving the item close to a barcode scanner (e.g., within a few inches) from a container that stores a group of items that include barcodes. The identification can be done even when an item transitions (e.g., moves) through a certain location within a facility in an unstructured manner, which may include flipping, rotating, throwing, etc. Also, software can perform the identification process automatically without human intervention.

The systems may include imaging sensors that are connected to computer systems via a dedicated network interface. The computer systems may receive a stream of images capturing an item before, during, or after the scanning process, alongside other items awaiting further scanning and processing. To increase the processing speed, the computer systems may convert the red, green, and blue (RGB) images to monochrome images and add time information in a separate channel. In one example, the computer systems may increase the number of channels of the RGB images by adding time series information. In another example, time information can be added to the same channel used for the color values. During scanning, the item moves through a three-dimensional (3D) space where it can be manipulated by an operator, such as a human or a robotic arm.

The computer systems may use a neural network to identify items that are actively manipulated by an operator, such as a human or a robotic arm. Specifically, the neural network may use either a single image or multiple images to generate binary segmentation masks or any other annotations (e.g., labels) to the images to distinguish pixels that correspond to the manipulated item from other items and background information. A neural network can receive a frame, where a frame is a single image within a sequence of images, e.g., that make up sequence of images captured over a period of time (e.g., a few milliseconds, a few seconds, a few minutes). A neural network may also receive several frames (e.g., several images at different times in a sequence). A single image, single frame, multiple images, and/or multiple images can depict the manipulated item. For example, the neural network can generate a binary mask that segments the manipulated item (e.g., moved by an operator, moved by a robot, held by an operator, held by a robot, or stored in bin next to other items) from other items appearing in the image (e.g., background objects with barcodes that are unrelated to the manipulated item). The neural network may include U-Net, EfficientNet or any other neural networks that are further described herein. Then, the computer systems may use another neural network to determine regions that correspond to structured identifiers of different objects within the stream of images. Another neural network may use images with different quality to determine the regions, where quality may refer to (or be based on) one or more image attributes, such as sharpness, noise, dynamic range, resolution, contrast, etc. The number of images used by the neural networks may differ. For instance, the neural network may use a single image to generate the binary segmentation masks, whereas another neural network may use multiple images to determine the regions that correspond to the structured identifiers.

In one example, the neural networks may operate sequentially. The neural network may generate binary segmentation masks, which are then utilized by another neural network to precisely identify the region containing the manipulated object. For example, a neural network can use several images of a manipulated item, select an image from the images to use for generating a mask, generate a mask that covers background items (e.g., unrelated barcodes or barcodes for different items), and provide the mask and image (e.g., together or separately) to a subsequent neural network that is trained to read a structured identifier (e.g., barcode, QR code, DataMatrix Code, PDF417, Aztec Code) for an item that is in the foreground (e.g., unmasked). In another example, two neural networks may operate in parallel. One network may generate binary segmentation masks, and the other may generate bounding boxes that identify regions corresponding to different objects. These outputs can be then used together to determine a candidate region that corresponds to the structured identifier of the manipulated object. In some examples, a single neural network may perform both manipulated item detections and structured identifier detections. Specifically, segmentation masks generated by a portion of the neural network can be used by other parts of the neural networks to identify a region corresponding to a structured identifier of the manipulated object. Alternatively, one portion of the neural network can generate embeddings that correspond to the manipulated object and other portion of the neural network may use the embeddings to identify the region corresponding to the structured identifier of the manipulated object.

After determining the region that corresponds to the structured identifier of the manipulated object, computer systems may use barcode decoders to obtain or generate information associated with the manipulated object. After scanning a batch of items that were placed in a container, computer systems may cause autonomous robots to move the container to a different location.

While the neural networks disclosed herein can generate a mask that covers (e.g., blocks) background items (e.g., unrelated barcodes for other items or other related portions of an image) or otherwise separates or segments an item of interest (e.g., an item in a hand of a warehouse employee) from background image features, the neural networks can also generate labels (e.g., an indication in a matrix that shows where an object of interest is located) for an image or coordinates that indicate an item of interest (e.g., in addition to or instead of a binary mask).

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) real-time performance of scanning structured identifiers by accurately detecting manipulated objects; and (2) minimized usage of computing resources (e.g., processing power, memory requirements) by targeting manipulated objects while scanning structured identifiers.

FIG. 1 illustrates an example system 100 for storing items, according to at least one embodiment. System 100 may be located in a facility (e.g., warehouse, factory, distribution center, fulfillment center, etc.). In some examples, system 100 can be a robotic stowing or picking system. The system can perform various operations to ship items to customers. For example, system 100 may include a rack 112 that includes multiple containers 114 (for holding or storing items 106). System 100 may include a robotic arm 110 that can pick up and move rack container 114 and/or item 106 in a desired location.

In some examples, autonomous robot 116 can move rack 112 to a position proximate to the robotic arm 110, e.g., to enable robotic arm 110 to stow items into (or pick items from) containers 114. Robotic arm 110 may be mobile and the racks 112 can be stationary. In this case, robotic arm 110 may move between the racks 112 to perform stow and pick operations.

The robotic arm 110 can include a mount, which can support various sensors and end-of-arm tools (EOATs) for stowing and/or picking items from the containers 114. For example, the mount supports an EOAT, which includes a suction device for grasping, transporting, and stowing items into a particular container. For example, the EOAT can grasp an item 106 (also referred to as a package or object) located in a holding area 104 (also referred to as an item holding location) and transport the item 106 to a particular container 114. Holding area 104 can be representative of a variety of surfaces and can have any form factor suitable for holding items (e.g., table, floor, conveyor belt, etc.).

In at least one embodiment, system 100 includes a computer system 102. Computer system 102 includes computer system 210 illustrated in FIG. 2. In some examples, when performing a pick or stow operation, the robotic arm 110 may transition an item through a scanning volume (e.g., from holding area 104 to a container 114) without explicitly presenting the item to an optical scanner for scanning. The operator does not have to orient item 106, such that the structured identifier on the shipping label 108 of item 106 is clearly visible to an optical scanner. Instead, as item 106 passes through the scanning volume, computer system 102 can capture, using one or more cameras 118, one or more images that depict items that include item 106. In system 100, one or more cameras 118 can be positioned in locations to have viewpoints of items while in a storage bin, while in a container, while in transit (e.g., moving in a warehouse on a robot or conveyer belt), or otherwise positioned to view the item. For example, one or more cameras 118 can be positioned in proximity to where a technician picks up an item so that the one or more cameras 118 can capture several images of the picked up item that include foreground and background information (e.g., other items including barcodes). Also, in system 100 one or more cameras 118 can be placed in locations to reduce ergonomic strain on technicians. For example, instead of a technician needing to crane their neck to see inside of a container or stress their arms or legs to move an item, one or more cameras 118 can be placed in a location to capture one or more images of the items such that ergonomic strain is avoided. Computer system 102 then uses one or more neural networks to identify object of interest within the one or more images and identify regions that indicate structured identifiers or the object of interest. Then, computer system 102 decodes structured identifier of the object of interest to obtain information associated with the object of interest.

In at least one embodiment, structured identifier may refer to a systematic arrangement of numbers, letters, or symbols designed to uniquely distinguish and categorize specific entities within a database or system. These identifiers are typically formatted according to a set of predefined rules or standards, allowing for consistent and efficient data retrieval, identification, and management. Structured identifier may include, for example, barcodes, QR codes, universal product code (UPC), Amazon Standard Identification Number (ASIN), International Standard Book Number (ISBN), etc.

In at least one embodiment, an object of interest may refer to any specific item, entity, or feature within a dataset, image, or scene that is the target of analysis, observation, or detection. The term can be used to denote the focal point of study or the primary subject that needs attention or action. For instance, in image processing and computer vision, an object of interest could be any discernible or meaningful component within an image that a system is designed to detect. In some examples, the object of interest can be manipulated items, where manipulated items may refer to items that are moved by a person and/or robotic arm 110 such that the item can be scanned by computer system 102. Manipulated items may include items that are moved from a bin into different containers of rack 112. Manipulated items may include items that are moved from a conveyor to another conveyor, table, staging location, containers of rack 112, etc. While moving the manipulated items, it may pass a scanning volume. Manipulated items may further include goods that are handled or modified in some way before being scanned. Also, manipulated items may include any items that are moved by the operator in the scene. In some examples, item 106 can have different shapes, such as, for example, cylinder, cone, triangle, etc.

In some examples, one or more cameras 118 can be connected to computer system 102 via a wireless or wired network. One or more cameras 118 can be connected via wired communication links. One or more cameras 118 can communicate with computer system 102 using a communication protocol, for example, Universal Serial Bus (USB), such as USB-3. One or more cameras 118 may include image sensor, imaging optics, and a network interface. One or more cameras 118 can capture one or more images of one or more items with the image sensor. The image sensor may use a rolling shutter or a global shutter. The imaging optics may include various optics, such as lens with a particular focal length. The network interface can include any communications interface (e.g., serial, wireless, etc.) that allows the one or more cameras 118 to communicate with other computers and/or components in computer system 102.

Figure 2:
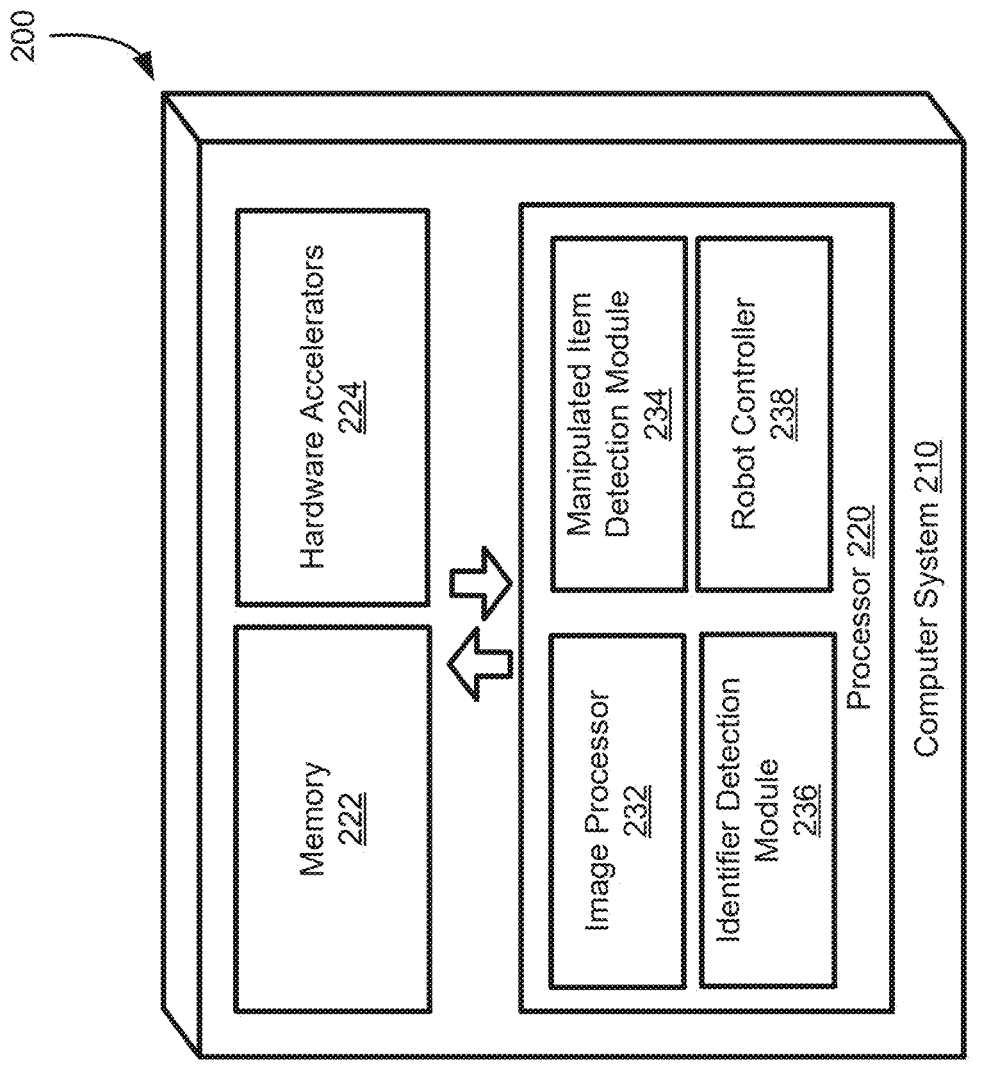
FIG. 2 illustrates an example system to identify manipulated objects, according to at least one embodiment.
Figure 6:
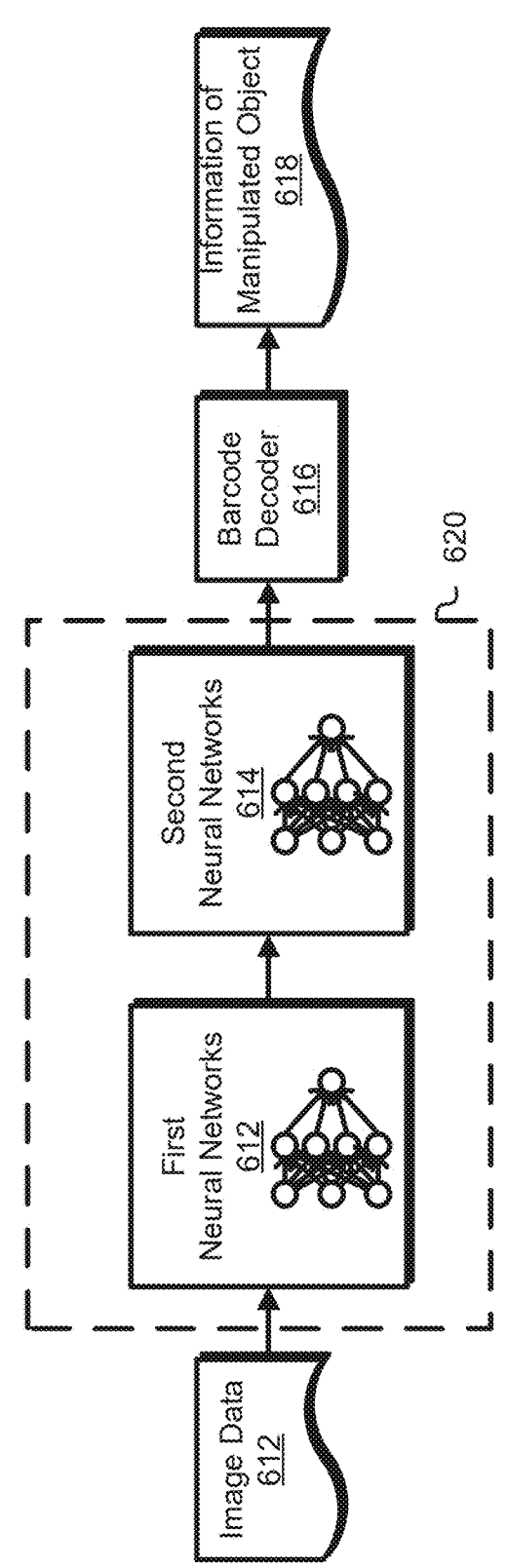
FIG. 6 illustrates an example system to scan structured identifier by identifying manipulated objects, according to at least one embodiment.
Figure 7:
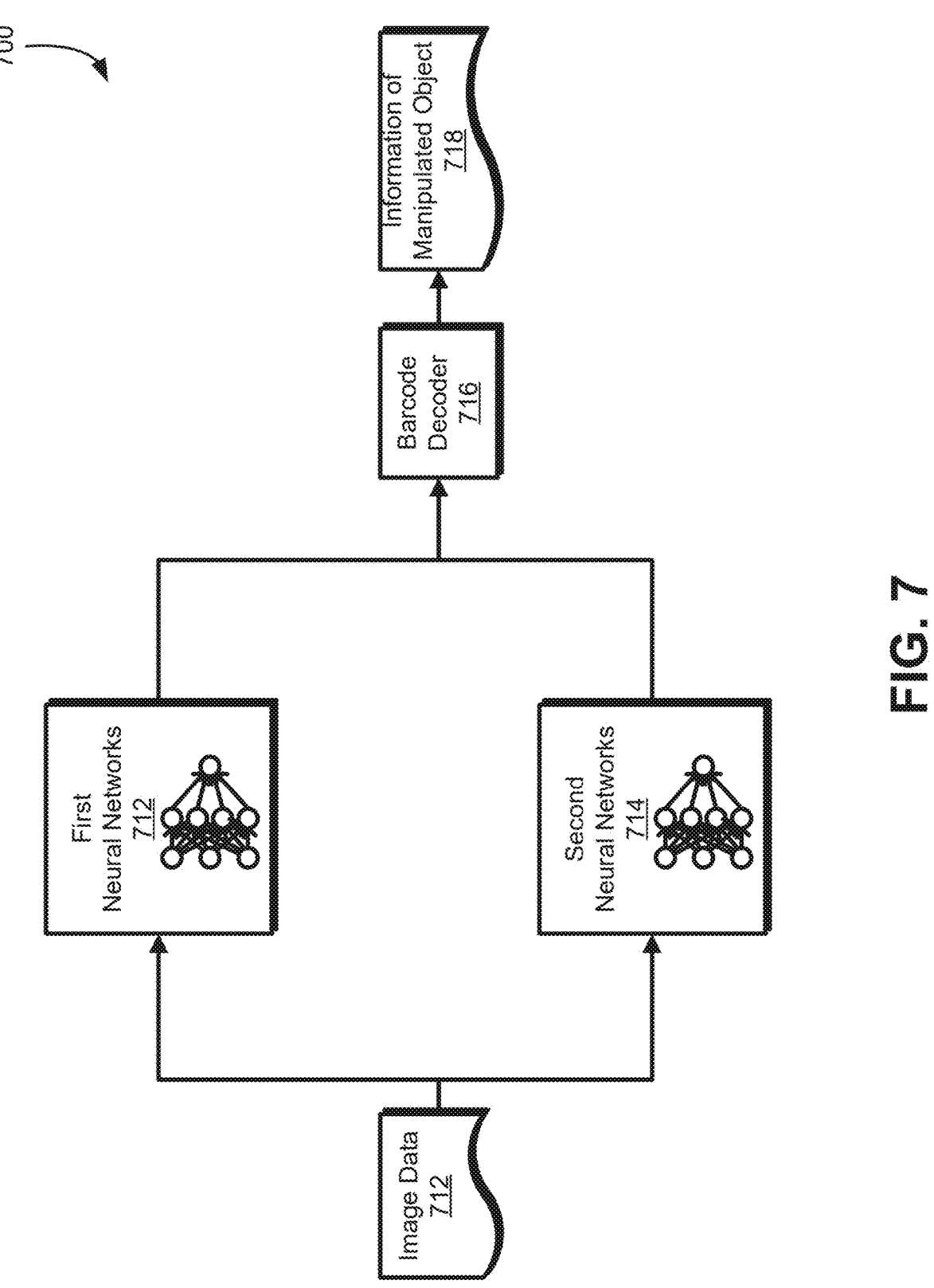
FIG. 7 illustrates another example system to scan structured identifier by identifying manipulated objects, according to at least one embodiment.

In at least one embodiment, during a workflow of workcells regarding item 108 performed by either an operator (e.g., human) or robotic arm 110, neural networks such as, for example, first neural networks 612 and second neural networks 614 illustrated in FIG. 6 or first neural networks 712 and second neural networks 714 illustrated in FIG. 7 can be used to (1) generate indications of item 108 among other items that are located near item 108, and (2) determine regions including the structured identifier of item 108. The workflow may include moving item 108 to, within, or from a scan zone containing other items with structured identifiers. This can occur during either a picking or placing operation, such as transferring items. FIG. 2 illustrates an example system 200 to identify manipulated objects, according to at least one embodiment. System 200 may include computer system 210. Computer system 210 may operate as a distributed computing system that comprises multiple interconnected computers or nodes working together to perform various tasks (e.g., neural network training/inferencing, manipulated object detection, structured identifier detection, etc.). Computer systems 210 may include processor 220, memory 222, and hardware accelerator 224.

In some examples, processor 220 may refer to one or more central processing units (CPU). Processor 220 may include multiple processors. Processor 220 may include image processor 232, manipulated item detection module 234, identifier detection module 236, and robot controller 238. Processor 220 may run software to provide functionality described herein. Terms such as "software" described herein may include one or more of operating systems, device drivers, application software, database software, graphics software (e.g., Radeon, Intel Graphics), web browsers, development software (e.g., integrated development environments, code editors, compilers, interpreters), network software (e.g., Intel PROset, Intel Advanced Network Services), simulation software, real-time operating systems (RTOS), artificial intelligence software (e.g., Scikit-learn, TensorFlow, PyTorch, Accord.NET, Apache Machout), robotics software (Robotics Benchmarks for Learning (RO-BEL), MS AirSi, Apollo Baidu, ROSbot 2.0, Poppy Project), firmware (e.g., BIOS/UEFI, router, smartphone, consumer electronics, embedded systems, printer, solid state drive (SSD)), application programming interface (API), containerized software (e.g., Nginx, Apache HTTP Server, MySQL, PostgreSQL, Redis, Memcached, Node.js, Elasticsearch, Gitlab, Jenkins, WordPress), container orchestration platform (e.g., Kubernetes, Docker Swarm, Apache Mesos, Nomad, Microsoft Azure Kubernetes Service, Google Kubernetes Engine, Red Hat OpenShift, Rancher) and any other implementation embodied as a software package, code and/or instruction set.

Terms such as "hardware" described herein may include, in addition to processor 220 and hardware accelerators 224, one or more of hardwired circuitry, programmable circuitry, state machine circuitry, fixed function circuitry, execution unit circuitry, and/or firmware that stores instructions executed by programmable circuitry. In various examples, as used in any implementation described herein, unless otherwise clear from context or stated explicitly to the contrary, terms such as "module" and nominalized verbs (e.g., image processor 232, manipulated item detection module 234, identifier detection module 236, robot controller 238, etc.) illustrated in at least FIG. 2 each refers to any combination of software logic, hardware logic, and/or circuitry configured to provide specific functionality.

In at least one embodiment, image processor 232 may refer to a module that generates and preprocesses (e.g., denoises, downsamples, upsamples, or otherwise modifies) images before they are used by manipulated item detection module 234 and/or identifier detection module 236. Image processor 232 may use cameras (e.g., cameras 118 illustrated in FIG. 1) to capture objects that are within, for example, a stow or pick system 100 and example 300 illustrated in FIGS. 1-3.

The cameras can be located in different places near a stow or pick system to capture objects from different perspectives. The cameras may include one or more (e.g., 1-10) cameras. Alternatively, some or all of the cameras may move around the robot work cell to capture objects from different perspectives. The cameras may include hardware devices such as digital cameras (e.g., Digital Single-Lens Reflex, mirror-less cameras), smartphones, tablets, webcams, action cameras, Closed-Circuit Television cameras, drones, ultrasound machines, and/or machine vision cameras.

In addition, image processor 232 may modify images captured by the cameras. Modification of images may include, for example, resizing, cropping, normalization (e.g., scaling intensity values), augmentation (e.g., rotation, flipping, zooming, shifting, other affine transforms), redistribution of intensity values (e.g., histogram equalization), denoising, enhancement (e.g., adjusting brightness, contrast, sharpness), color space conversion, filtering (e.g., Laplacian, Sobel, Gaussian blur), image alignment, scaling (e.g., deep learning super-sampling (DLSS), Xe super-sampling (XeSS), AMD FidelityFX Super Resolution (FSR)), and/or anti-aliasing (e.g., multi-sample anti-aliasing (MSAA), fast approximate anti-aliasing (FXAA), temporal anti-aliasing (TAA), super-sampling anti-aliasing (SSAA), conservative morphological anti-aliasing (CMAA)).

Image processor 232 may generate or modify neural network training data that can be used by manipulated item detection module 234 and identifier detection module 236. For example, image processor 232 may generate labels for supervised learning or generate partially labeled data for semi-supervised learning of neural networks. Image processor 232 may receive indications of ground truth to generate those labels. Image processor 232 may increase the number of channels of image data by adding time series information to the image data.

In at least one embodiment, robot controller 238 may refer to a module that generates control signals or other information that causes robots (e.g., robot arm 110 and autonomous robots 116 illustrated in FIG. 1) to move as intended. For example, robot controller 238 may receive information of objects to be placed using manipulated item detection module 234 and identifier detection module 236 and may determine which location to place the objects using the robots. Additionally, robot controller 238 may receive additional information (e.g., geometry information of containers and other objects that are inside the containers) to make the determination.

Based on the determination, robot controller 238 may generate control signals to cause robots to pick up one or more objects and place the one or more objects into one or more containers. When any of the one or more containers are full of objects, robot controller 238 may generate control signals to cause autonomous robots (e.g., carts) to move containers to a different location inside or outside of a warehouse. Robot controller 238 can use either wireless or wired communication to communicate (e.g., transmit signals) to robot and/or the autonomous robots that move containers. Wireless communication may include radio frequency (RF) communication, Wi-Fi, Bluetooth, infrared communication, near field communication, cellular communication, satellite communication, long range (LoRA), etc.

Robot controller 238 may dynamically assign tasks based on the robots' proximity, capabilities, and current workload. Robot controller 238 may perform a scheduling algorithm that optimizes task sequences to minimize completion time and maximize overall efficiency. Robot controller 238 may anticipate changes in operational demands and adjusts task allocations accordingly.

To assign tasks, robot controller 238 decomposes complex tasks into manageable sub-tasks. Then, robot controller 238 may plan the sequence of actions required to accomplish each sub-task, considering factors such as efficiency, safety, and the capabilities of each robot. For each sub-task, robot controller 238 may determine the optimal path and movements required. Path planning may include calculating the most efficient routes for the robots to take, avoiding obstacles, and ensuring that robots do not collide with each other. Motion control may include the precise control of each robot's motors and actuators to follow the planned path and execute the required movement. Additionally, robot controller 238 may generate control signals by translating the planned actions and movements. These signals may include typically electrical or digital commands that directly interface with the robots' drive systems (motors, actuators) and other functional components (grippers, sensors). Robot controller 238 may send control signals to the robots through wired or wireless communication protocols. The choice of communication medium depends on factors such as the operational environment, the required response time, and the distance between the controller and the robots.

Additionally, robot controller 238 may include a monitoring interface that provides real-time feedback on the status and position of each robotic device. This allows operators of a warehouse to manually override the system to redirect robots or adjust task priorities in response to emergent situations, ensuring flexibility and responsiveness in dynamic environments. Robot controller 238 may include various sensors to implement safety protocols to prevent collisions and ensure the safety of both robots and human personnel. In particular, robot controller 238 may continuously scan the operational environment to identify potential hazards and autonomously adjusts the robots' paths to avoid them.

Robot controller 238 may use one or more neural networks to utilize historical performance data to identify patterns and inefficiencies. The one or more neural networks can be reinforced using such data and refines its task allocation, scheduling, and safety protocols to enhance performance and reduce operational costs. Robot controller 238 may generate one or more control signals that cause a robot (e.g., robotic arm 110 illustrated in FIG. 1) to place the object of interest in a container as part of a picking operation. Robot controller 238 may generate one or more control signals that cause a robot (e.g., autonomous robot 116 illustrated in FIG. 1) to place a container in a different location as a result of determining that the object of interest is placed inside the container.

In at least one embodiment, memory 222 may refer to one or more devices to store data. Memory 232 may include one or more random access memory (RAM), read-only memory (ROM), flash memory (e.g., USB flash drives, SSD, memory cards), cache memory, hard disk drives (HDDs), virtual memory, graphics memory, optical discs, network attached storage (NAS), cloud storage, tape storage, etc. Memory 222 may store images captured from the cameras, where the stored images might be subject to modification by image processor 232. Memory 222 may also store modified images generated by image processor 232.

In addition, memory 222 may store neural network training data (either labeled or unlabeled) and hyperparameters usable by manipulated item detection module 234 and/or identifier detection module 236 to train neural networks described herein. Hyperparameters may include learning rate, number of epochs, batch size, activation functions (e.g., rectified linear unit, sigmoid, tanh), network architecture, optimizer (e.g., stochastic gradient descent, Adam, RMSprop, and Adagrad), regularization techniques (e.g., L1, L2, dropout, early stopping), initialization methods (e.g., Xavier, He, random), weight decay, etc. Also, memory 222 can store various data and information generated by image processor 232, manipulated item detection module 234, identifier detection module 236, and robot controller 238.

In at least one embodiment, hardware accelerators 224 may refer to one or more of specialized hardware units designed to perform specific tasks more efficiently than a general-purpose processor. Hardware accelerators include one or more of integrated circuit (IC), system on-chip (SoC), graphics processing unit (GPU), data processing unit (DPU), digital signal processor (DSP), tensor processing unit (TPU), accelerated processing unit (APU), application-specific integrated circuits (ASIC), intelligent processing unit (IPU), neural processing unit (NPU), smart network interface controller (SmartNIC), vision processing unit (VPU), field-programmable gate array (FPGA), etc.

The specific tasks performed by hardware accelerators 224 may include neural network inferencing and training performed by manipulated item detection module 234 and/or identifier detection module 236. For example, neural network inferencing may include image classification, object detection, image segmentation (e.g., semantic segmentation, instance segmentation), image super-resolution, image synthesis and generation, style transfer, etc. Additionally, hardware accelerators 224 may accelerate the performance of one or more blocks of process 800 and/or process 900 illustrated in FIGS. 8-9. Hardware accelerators 224 may accelerate different robot control operations performed by robot controller 238. Also, hardware accelerators 224 may accelerate image generation and modification process performed by image processor 232.

In at least one embodiment, manipulated item detection module 234 can be a module to detect object of interest (e.g., manipulated item). Manipulated item detection module 234 may use one or more neural networks (e.g., first neural networks 612 illustrated in FIG. 6, first neural networks 712 illustrated in FIG. 7), where the one or more neural networks are trained by, for example, training framework 504 illustrated in FIG. 5 to identify the object of interest among other objects depicted within one or more images. Specifically, the one or more neural networks generate indications (e.g., binary segmentation masks) in the one or more images such that identifier detection module 236 can detect structured identifiers of the object of interest using the indications. During training of the one or more neural networks, the loss function can be the difference between ground truth label that indicates the object of interest and the binary segmentation masks.

The one or more neural networks may identify the object of interest in a scene by analyzing the optical flow, which represents the motion of objects between consecutive frames of video or different regions within a single image. By focusing on the magnitude of the optical flow, the neural network can determine that the object with the largest optical flow is the object of interest. This approach works under the assumption that the most significant motion within the scene relates to the primary object of interest, possibly because it is moving faster or more distinctly than other objects in the environment. Alternatively, the one or more neural networks can be trained to identify the object of interest based on size, pose, and/or location of the object. Also, the one or more neural networks can be trained to identify objects of interest in images by first detecting the presence and position of an operator, such as an EOAT or a human hand. The networks are specifically trained to recognize these operators within the visual data. Once the operator is identified, the neural network then focuses on objects in close proximity to this operator, under the assumption that the operator is interacting with or manipulating these nearby objects. The one or more neural networks can be trained to identify the object of interest based on depth information of the items.

In at least one embodiment, identifier detection module 236 can be a module to detect structured identifier of different objects. Identifier detection module 236 may use one or more neural networks (e.g., second neural networks 614 illustrated in FIG. 6, second neural networks 714 illustrated in FIG. 7), where the one or more neural networks are trained by, for example, training framework 504 illustrated in FIG. 5 to identify the structured identifier within different objects. Specifically, the one or more neural networks generate indications (e.g., bounding boxes) in the one or more images, where the indications show regions that include structured identifiers.

Additionally, identifier detection module 236 may include different tools (e.g., detector tool, analysis tool, decoding tool) further disclosed in U.S. Pat. No. 11,893,786 B1, issued on Feb. 6, 2024, which is incorporated by reference.

Figure 3:
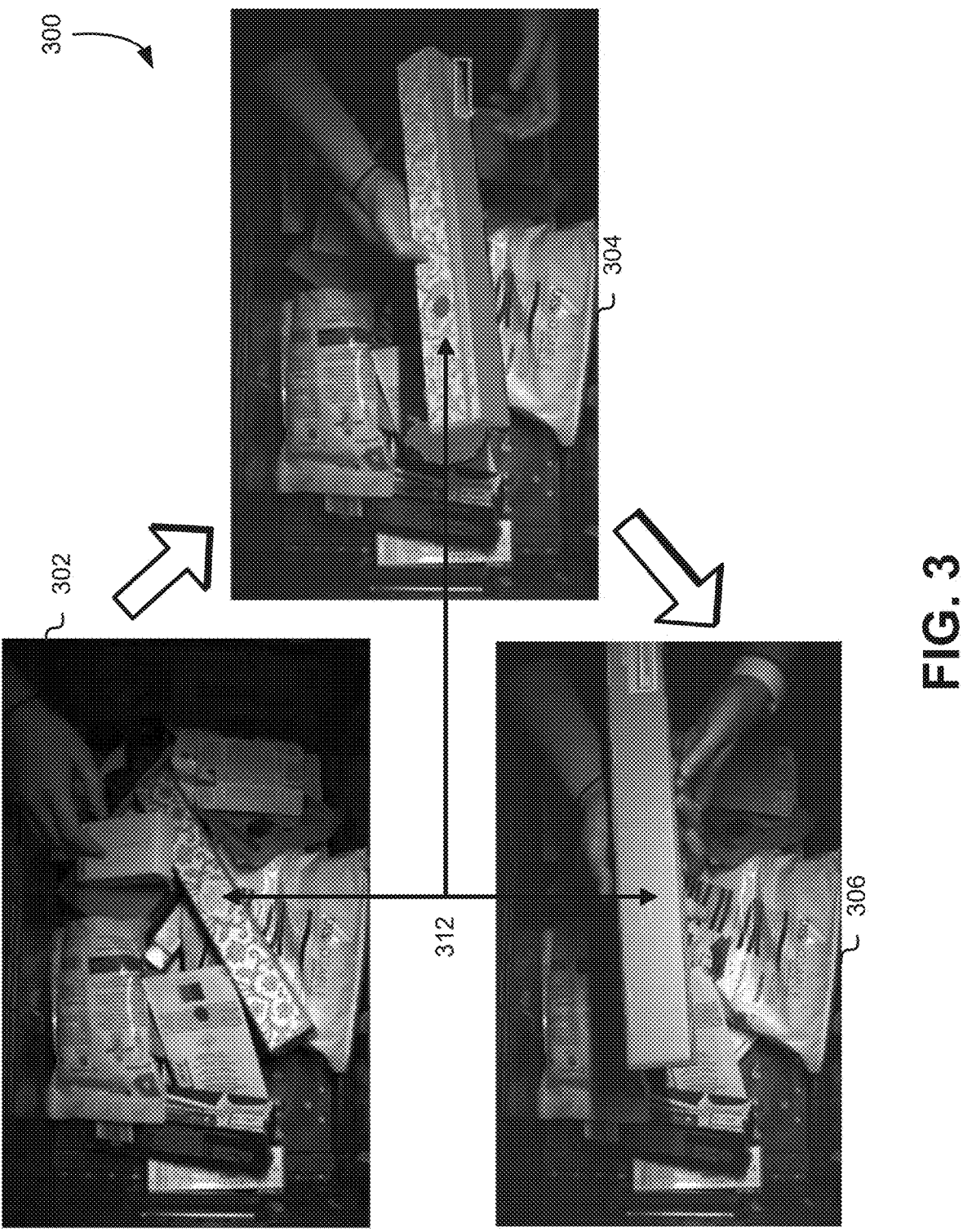
FIG. 3 illustrates an example of identifying manipulated objects, according to at least one embodiment.

FIG. 3 illustrates an example 300 of identifying manipulated objects, according to at least one embodiment. Example 300 may include first image 302, second image 304, and third image 306. In some examples, example 300 is to depict transitioning an item through a scanning volume (e.g., from holding area 104 to a container 114 illustrated in FIG. 1). One or more cameras 118 illustrated in FIG. 1 capture first image 302, second image 304, and third image 306 and send those to computer system (e.g., computer system 100, computer system 200). First image 302, second image 304, and third image 306 include manipulated object 312 that is moved by an operator (e.g., human, robotic arm 110 illustrated in FIG. 1). Computer system may use one or more neural networks (e.g., first neural networks 612 illustrated in FIG. 6, first neural networks 712 illustrated in FIG. 7) to identify manipulated object 312 and generate indications (e.g., binary segmentation masks) to label manipulated object 312 within first image 302, second image 304, and third image 306.

In at least one embodiment, the one or more neural networks may identify the object of interest depicted in the one or more images. In the one or more images, there can be multiple objects, as shown in first image 302, second image 304, and third image 306. Alternatively, there can be a single object depicted at least one of the one or more images. The one or more images can depict the object of interest at different points in time.

In at least one embodiment, the one or more neural networks can identify the object of interest in a scene by analyzing the optical flow, which represents the motion of objects between consecutive frames of video. By focusing on the magnitude of the optical flow, the one or more neural networks can determine that the object with the largest optical flow is the object of interest. This approach works under the assumption that the most significant motion within the scene relates to the primary object of interest, possibly because it is moving faster or more distinctly than other objects in the environment. In some examples. the one or more neural networks may use an image with a single object (which is the object of interest) and use the image in conjunction with other images to identify the object of interest.

In at least one embodiment, the one or more neural networks may delineate the object of interest (e.g., manipulated object 312) from other objects in first image 302, second image 304, and third image 306. The one or more neural networks may scan first image 302, second image 304, and third image 306 and may generate a segmented map that highlights the boundaries and contours of the manipulated object 312, effectively isolating it from the rest of the scene. This can effectively exclude other items in first image 302, second image 304, and third image 306 that have structured identifiers.

In some examples, when the operator flips, rotates, or otherwise change pose of manipulated object 312, structured identifier of manipulated object 312 can be shown. For example, in first image 302 and second image 304, structured identifier can be shown when the operator picks up manipulated object 312. Computer system may use one or more other neural networks (e.g., second neural networks 614 illustrated in FIG. 6, second neural networks 714 illustrated in FIG. 7) to identify one or more regions that indicate the structured identifier. The computer system can address the time-consuming issue of motion during the scanning process, which involves picking up an item, scanning it, and transferring it. This task requires the operator to explicitly re-orient and present each item to the scanner, significantly slowing down operations. The computer system also removes the need to isolate structured identifiers for other objects within first image 302, second image 304, and third image 306, which results in faster processing time. This is done by the computer system identifying the exact structured identifier of the manipulated object 312 while excluding other structured identifiers of other objects that are within first image 302, second image 304, and third image 306.

Figure 4:
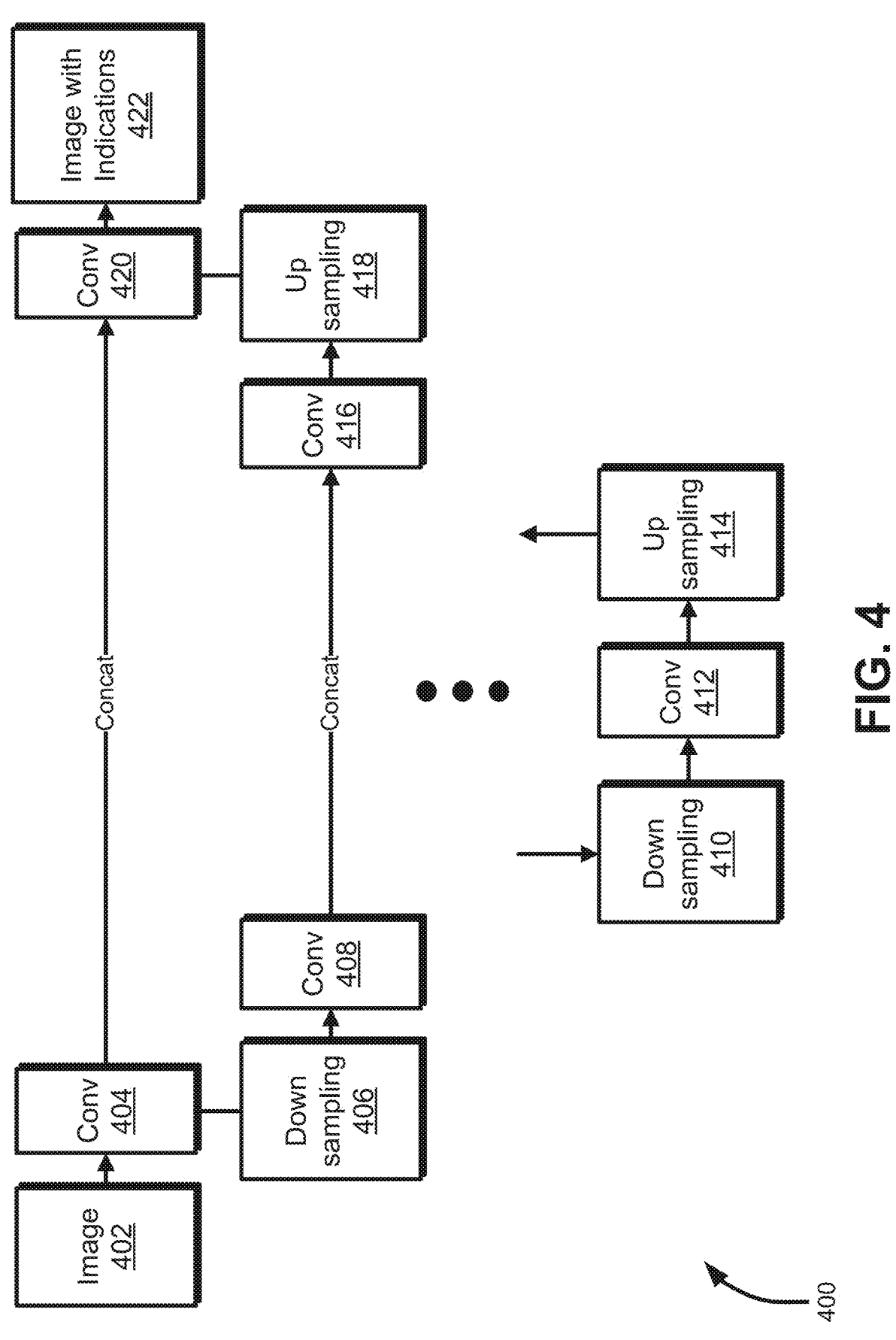
FIG. 4 illustrates an example neural network to identify manipulated objects, according to at least one embodiment.

FIG. 4 illustrates an example neural network 400 to identify manipulated objects, according to at least one embodiment. In at least one embodiment, neural network 400 may include trained neural network 508 and can be trained using training framework 504 illustrated in FIG. 5.

In at least one embodiment, neural network 400 may include U-net. U-Net may refer to a convolutional neural network architecture with a distinctive U-shaped design. It consists of a contracting path that captures context by progressively reducing the spatial dimensions of the input, and a symmetric expanding path that incrementally increases the spatial dimensions to enable precise localization. The architecture may include a large number of feature channels in the upsampling part and skip connections that allow the transfer of context information directly across corresponding layers of the network. The architecture can be used to maintain high-resolution features at each step of the network, facilitating detailed image analysis.

In at least one embodiment, neural network 400 receives one or more images 402 as inputs. One or more images 402 may include RGB images or monochrome images. One or more images 402 may include time information. In one example, for monochrome images, there can be a separate channel for time information. In some examples, one or more images 402 may include RGB images where the number of channels of the RGB images was increased as a result of adding time series information to the RGB images. In other examples, the number of channels remain the same because time information is mixed into the same channel for the color information. For instance, instead of RGB images having [R, G, B], RGB images with time information on the same channel can be [[R1, G1, B1], [R2, G2, B2], . . . [RT, GT, BT]]. Neural network 400 may include encoding part to extract features while downsampling image data and decoding part to convert the features back into an image of the same size as the original input.

Inputs for one or more convolutional layers 404 are one or more images 402. One or more convolutional layers 404 can be to capture high-level features within one or more images 402. One or more convolutional layers 404 can increase the number of channels of one or more images 402. The high-level features can become inputs to one or more downsampling layers 406. One or more downsampling layers 406 may include one or more max pooling or strided convolutions, which reduce the size of the feature maps. Reduced features can become inputs to one or more convolutional layers 408 to perform additional feature extraction. Those layers (e.g., downsampling layers 410) can be repeated until it reaches the bottleneck. The bottleneck may include one or more convolutional layers 412 to process more complex features and capture the most abstract representations of one or more images 402. After performing complex feature processing and context integration, decoding part of neural network 400 starts with one or more upsampling layers 414, which increase the spatial resolution of the feature map while reducing the number of channels. The skip connections (e.g., concatenations) from the encoding part are used to help the decoder parts (e.g., one or more convolutional layers 416, one or more upsampling layers 418, one or more convolutional layers 420) locate and refine the features in the image. Finally, each pixel in image with indications 422 may represent a label that corresponds to the manipulated object described herein. The indications may include a binary segmentation map where each pixel represents a foreground or background region.

Figure 5:
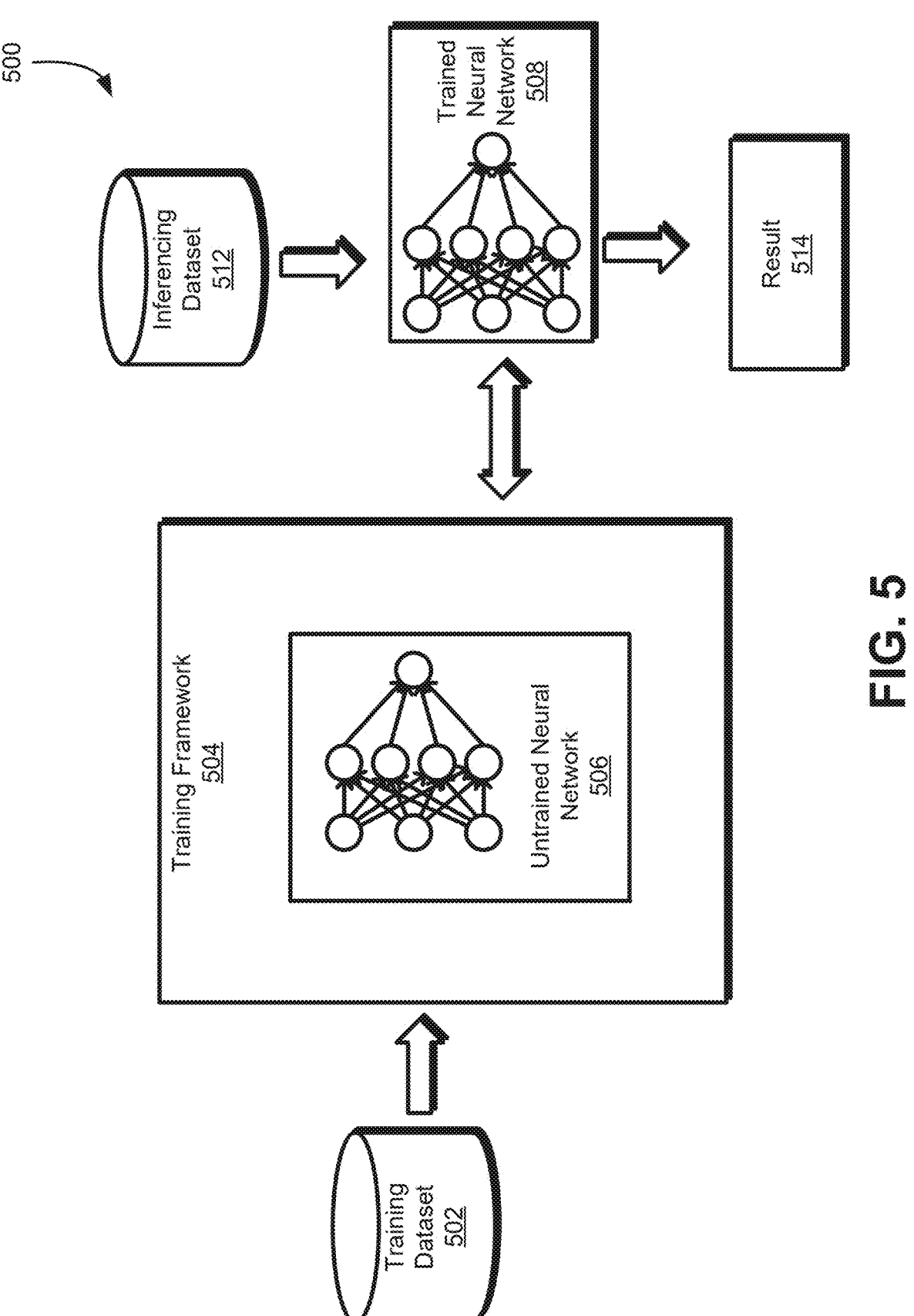
FIG. 5 illustrates an example system to train neural networks, according to at least one embodiment.

FIG. 5 illustrates an example system 500 to train neural networks, according to at least one embodiment. Untrained neural network 506 can be trained using a training dataset 502. An untrained neural network may refer to a neural network architecture that has been initialized but not yet exposed to any training data. Untrained neural network 506 may lack the capability to make accurate predictions or decisions. Training framework 504 can be a PyTorch framework, whereas in other embodiments, training framework 504 can be a TensorFlow, Boost, Caffe, Microsoft Cognitive Toolkit/CNTK, MXNet, Chainer, Keras, Deeplearning4j, or other training framework. Training framework 504 may train an untrained neural network 506 and enables it to be trained using processing resources (e.g., hardware accelerators 224 illustrated in FIG. 2) described herein to generate a trained neural network 508. Determining initial weights of untrained neural network 506 may include performing Zero Initialization, which sets all weights to zero. In other examples, determining initial weights of untrained neural network 506 may include performing one or more of (1) random Initialization, where weights are set to small random values; (2) Glorot Initialization that adjusts the scale of the weights according to the number of input and output neurons; or (3) He Initialization that sets weights with a variance scaled by the number of input neurons. Training may be performed in either a supervised, partially supervised, or unsupervised manner. Also, training may include federated learning, where multiple decentralized devices or servers collaboratively train a model while keeping the training data localized.

In at least one embodiment, untrained neural network 506 can be trained using supervised learning, wherein training dataset 502 includes an input paired with a desired output for an input, or where training dataset 502 includes input having a known output and an output of untrained neural network 506 is manually graded. Untrained neural network 506 can be trained in a supervised manner and processes inputs from training dataset 502 and compares resulting outputs against a set of expected or desired outputs. Errors can be propagated back through untrained neural network 506. Training framework 504 can adjust weights that control untrained neural network 506. Training framework 504 may include tools to monitor how well untrained neural network 506 is converging towards a model, such as trained neural network 508, suitable to generating correct answers, such as in result 514, based on input data such as an inferencing dataset 512. Training framework 504 may train untrained neural network 506 repeatedly while adjusting weights to refine an output of untrained neural network 506 using a loss function and adjustment algorithm, such as stochastic gradient descent. For retraining the trained neural network 508 using the training framework 504, the loss function may include dice loss and adapted dice loss to encourage the trained neural network 508 to generate more conservative prediction by modifying one or more hyperparameters. Training framework 504 may train untrained neural network 506 until untrained neural network 506 achieves a desired accuracy. Trained neural network 508 can then be deployed to implement any number of machine learning operations.

In some examples, there can be one or more neural networks (separate from untrained neural network 506 and trained neural network 508) that generates training dataset 502. For example, the one or more neural networks may include Generative Adversarial Networks (GANs) or Variational Autoencoders (VAEs) that mimic the characteristics of a genuine dataset. The synthetic images can be accompanied by accurate segmentation maps that label different parts of the image according to predefined categories.

In at least one embodiment, untrained neural network 506 can be trained using unsupervised learning, wherein untrained neural network 506 attempts to train itself using unlabeled data. Unsupervised learning training dataset 502 can include input data without any associated output data or ground truth data. Untrained neural network 506 can learn groupings within training dataset 502 and can determine how individual inputs are related to untrained dataset 502. Unsupervised training can be used to generate a self-organizing map in trained neural network 508 capable of performing operations useful in reducing dimensionality of inferencing dataset 512. Unsupervised training can also be used to perform anomaly detection, which allows identification of data points in inferencing dataset 512 that deviate from normal patterns of inferencing dataset 512.

Semi-supervised learning may be used, which refers to a technique in which training dataset 502 includes a mix of labeled and unlabeled data. Training framework 504 may be used to perform incremental learning, such as through transferred learning techniques. The incremental learning may enable trained neural network 508 to adapt to inferencing dataset 512 without forgetting knowledge instilled within trained neural network 508 during initial training.

FIG. 6 illustrates an example system 600 to scan structured identifier by identifying manipulated objects, according to at least one embodiment. System 600 can be a combination of hardware and software described in conjunction with FIG. 2. System 600 may include first neural networks 612, second neural networks 614, and barcode decoder 616.

In at least one embodiment, first neural networks 612 can be one or more neural networks that performs manipulated item identification. First neural networks 612 may include convolutional neural networks such as, for example, LeNet, AlexNet, Visual Geometry Group, Inception, ResNet, U-Net, DenseNet, MobileNet, EfficientNet, Capsule Networks, YOLO, Fully Convolutional Network, Regions with Convolutional Neural Networks, V-Net, etc. First neural networks 612 may include neural networks that performs image segmentation such as, for example, SegNet, DeepLab, PSPNet, RefineNet, etc. First neural networks 612 may include feed forward neural networks, recurrent neural networks, long short-term memory networks, autoencoders, generative adversarial networks, transformers, etc. First neural networks 612 may include trained neural network 508 and can be trained using training framework 504 illustrated in FIG. 5. In some examples, first neural networks 612 may include neural network 400 illustrated in FIG. 4.

First neural networks 612 may receive image data 612 as inputs, where image data 612 may include one or more RGB images or one or more monochrome images. Images may include one or more objects that have structured identifiers. In at least one embodiment, image data 712 may include one or more first images that include a single object and one or more second images that include two or more objects. First neural networks 612 may generate indications to the image data 612, where the indications are directed to a manipulated object. For example, the indications may include (1) label to each pixel that indicates what object or category the pixel belongs to; (2) binary masks that separate the manipulated object from the background; (3) multi-class masks; and (4) boundary and edge maps.

In at least one embodiment, the indications generated by first neural networks 612 can be an input to second neural networks 614. Second neural networks 614 can be one or more neural networks to identify a region that includes structured identifiers within objects. Second neural networks 614 can include a fully convolutional one-stage object detection architecture. Second neural networks 614 may include other convolutional neural networks such as, for example, LeNet, AlexNet, Visual Geometry Group, Inception, ResNet, U-Net, DenseNet, MobileNet, EfficientNet, Capsule Networks, YOLO, Fully Convolutional Network, Regions with Convolutional Neural Networks, V-Net, etc. Second neural networks 614 may include feed forward neural networks, recurrent neural networks, long short-term memory networks, autoencoders, generative adversarial networks, transformers, etc. By using the indications and image data 612, second neural networks 614 can generate bounding boxes and/or confidence scores, where the bounding boxes indicate regions within image data 612 that include structured identifier for the manipulated object.

In some examples, first neural networks 612 and second neural networks 614 can become part of a larger neural network 620 (e.g., multi-headed neural network) that can perform both (1) manipulated item detection, and (2) structured identifier detection. The larger neural network 620 can be trained neural network 508 that is trained using training framework 504 illustrated in FIG. 5.

In at least one embodiment, barcode decoder 616 may receive data (e.g., bounding boxes) generated by second neural networks 614. Barcode decoder 616 can be a tool to decode one or more structured identifiers contained within the regions identified using second neural networks 614. Barcode decoder 616 may include any kind of structured identifier decoder. Barcode decoder 616 can interpret the sequence of lines or patterns according to pre-set standards (such as UPC or QR codes). Barcode decoder 616 can generate or obtain information of manipulated object 618 using the structured identifier that was within the manipulated objects. Information of manipulated object 618 may include, without limitation, product identification number, batch/lot number, expiration date, serial number, manufacturer information, price information, weight and dimensions, order information, destination data, etc.

FIG. 7 illustrates another example system 700 to scan structured identifier by identifying manipulated objects, according to at least one embodiment. System 700 can be a combination of hardware and software described in conjunction with FIG. 2. System 700 may include first neural networks 712, second neural networks 714, and barcode decoder 716.

In at least one embodiment, first neural networks 712 can be one or more neural networks that perform manipulated item identification. First neural networks 712 may include convolutional neural networks such as, for example, LeNet, AlexNet, Visual Geometry Group, Inception, ResNet, U-Net, DenseNet, MobileNet, EfficientNet, Capsule Networks, YOLO, Fully Convolutional Network, Regions with Convolutional Neural Networks, V-Net, etc. First neural networks 712 may include neural networks that performs image segmentation such as, for example, SegNet, DeepLab, PSPNet, RefineNet, etc. First neural networks 712 may include feed forward neural networks, recurrent neural networks, long short-term memory networks, autoencoders, generative adversarial networks, transformers, etc. First neural networks 712 may include trained neural network 508 and can be trained using training framework 504 illustrated in FIG. 5. In some examples, first neural networks 712 may include neural network 400 illustrated in FIG. 4.

First neural networks 712 may receive image data 712 as inputs, where image data 712 may include one or more RGB images or one or more monochrome images. Images may include one or more objects that have structured identifiers. In at least one embodiment, image data 712 may include one or more first images that include a single object and one or more second images that include two or more objects. First neural networks 712 may generate indications to the image data 712, where the indications are directed to a manipulated object. For example, the indications may include (1) label to each pixel that indicates what object or category the pixel belongs to; (2) binary masks that separate the manipulated object from the background; (3) multi-class masks; and (4) boundary and edge maps.

Concurrently, second neural networks 714 may receive image data 712 as inputs. Second neural networks 714 can be one or more neural networks to identify a region that includes structured identifiers within objects. Second neural networks 714 can include a fully convolutional one-stage object detection architecture. Second neural networks 714 may include other convolutional neural networks such as, for example, LeNet, AlexNet, Visual Geometry Group, Inception, ResNet, U-Net, DenseNet, MobileNet, Efficient-Net, Capsule Networks, YOLO, Fully Convolutional Network, Regions with Convolutional Neural Networks, V-Net, etc. Second neural networks 614 may include feed forward neural networks, recurrent neural networks, long short-term memory networks, autoencoders, generative adversarial networks, transformers, etc. By using image data 712, second neural networks 714 can generate multiple bounding boxes and/or confidence scores, where the multiple bounding boxes indicate regions within image data 712 that include structured identifiers for multiple objects.

In at least one embodiment, data generated by both first neural networks 712 and second neural networks 714 can be combined to identify one or more regions within image data that corresponds to a structured identifier of a manipulated object. The identified one or more regions can be input to barcode decoder 716 that generates information of manipulated object 718.

Barcode decoder 716 can be a tool to decode one or more structured identifiers contained within the regions identified using second neural networks 714. Barcode decoder 716 can interpret the sequence of lines or patterns according to pre-set standards (such as UPC or QR codes). Barcode decoder 716 can generate or obtain information related to manipulated objects 718 using the structured identifier that was within the manipulated objects. Barcode decoder 616 may include any kind of barcode scanning software. Information of manipulated object 718 may include, without limitation, product identification number, batch/lot number, expiration date, serial number, manufacturer information, price information, weight and dimensions, order information, destination data, etc.

Figure 8:
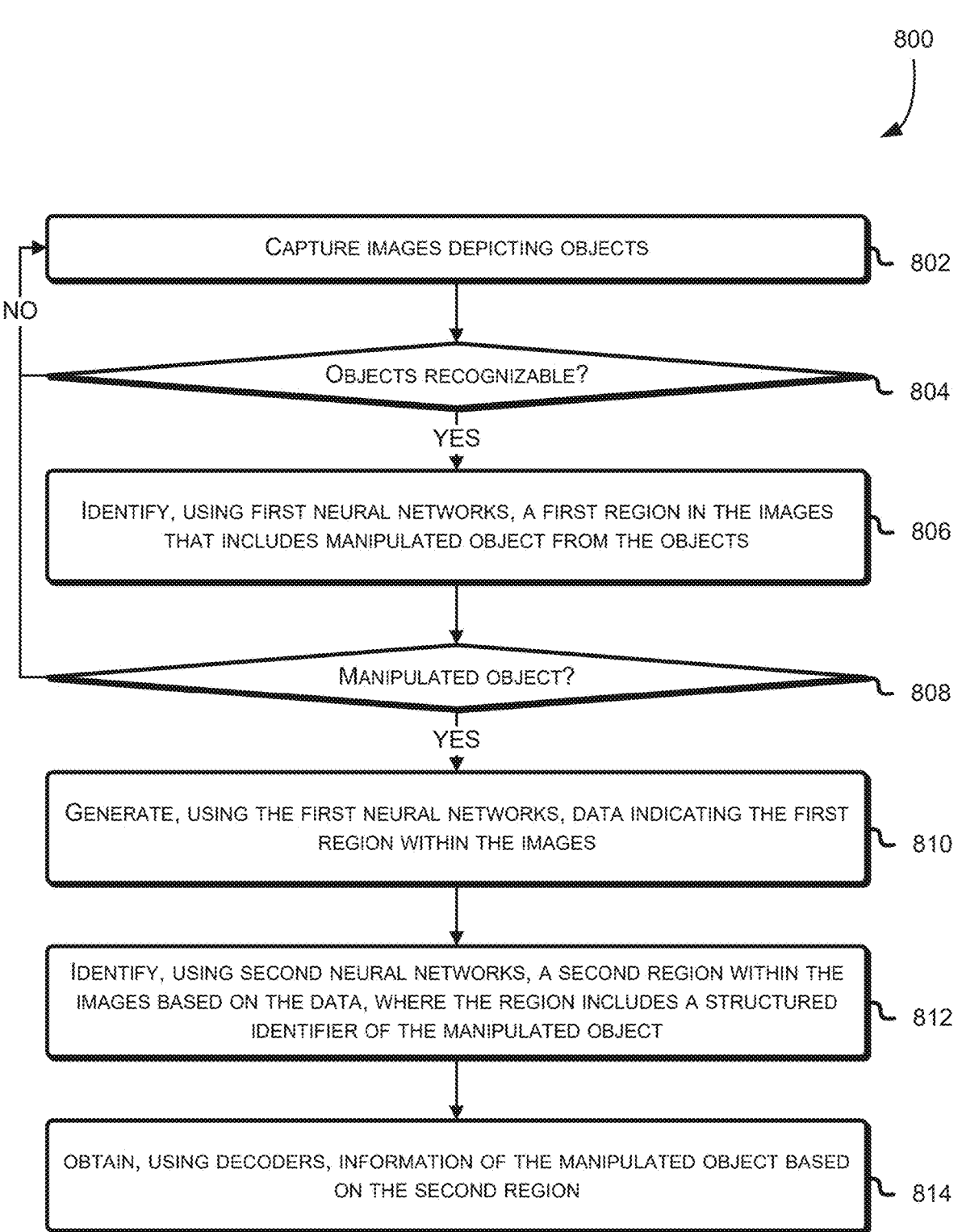
FIG. 8 illustrates an example process to scan structured identifier by identifying manipulated objects, according to at least one embodiment.

FIG. 8 illustrates an example process 800 to scan structured identifier by identifying manipulated objects, according to at least one embodiment. Although process 800 is depicted as a series of steps or operations, it will be appreciated that at least one embodiment of process 800 includes altered or reordered steps or operations, or omits certain steps or operations, except where explicitly noted or logically required, such as when an output of one step or operation is used as input for another. One or more entities described in conjunction with FIGS. 1, 2, and 4-7, singly or in any combination, perform each block of process 800. For example, the one or more entities may include computer system 102, image processor 232, manipulated item detection module 234, identifier detection module 236, robot controller 238, neural network 400, first neural networks 612, second neural networks 614, barcode decoder 616, first neural networks 712, second neural networks 714, and barcode decoder 716. The one or more entities may further include, for example, one or more of hardware, firmware, and/or software described in conjunction with FIG. 2.

Various functions can be carried out by a processor executing instructions stored in memory (e.g., computer readable, machine readable) to perform process 800. Also, process 800 may be implemented as computer-usable instructions (e.g., macro instruction, micro-instruction) stored on computer storage media or provided by a standalone application, a service or hosted service (standalone or in combination with another hosted service).

At block 802, the one or more entities may capture images that depict two or more objects. The one or more entities may use a single camera to sequentially capture images of two or more objects over time. Alternatively, or additionally, the one or more entities may use multiple cameras to capture images of two or more objects from various viewpoints. The one or more entities may use a single, mobile camera (e.g., rotating) to capture images of two or more objects from different viewpoints.

At block 804, the one or more entities may determine if the quality of the images is good enough to recognize the two or more objects, process 800 may move to block 806. If not, process 800 moves to block 802 to receive additional images that accurately depict the two or more images.

At block 806, the one or more entities may identify, using one or more first neural networks, a first region in the images that includes at least one manipulated object from the two or more objects. At block 808, the one or more entities may determine whether there is a manipulated object within the images. If yes, then process 800 may move to block 810. If not, then process 800 may move to block 802.

At block 810, the one or more entities may generate, using one or more first neural networks, data indicating the first region within the images. The one or more entities may use the one or more first neural networks to select which image, among the multiple images, to generate data. The selection can be based on how the manipulated object is depicted among the multiple images. Alternatively, the one or more entities may generate data for all images. The data may include labels assigned to each pixel of the selected image. One example may include labeling a manipulated object with one color and other pixels (e.g., background, unrelated image information) with a different color. Another example can be applying segmentation masks. For example, segmentation masks can be binary masks where 0 indicates background or unrelated image information and 1 for the object of interest (e.g., manipulated object) or foreground.

At block 812, the one or more entities may identify, using one or more second neural networks, a second region within the one or more images based on the data, where the region includes a structured identifier of the manipulated object.

At block 814, the one or more entities may obtain, using one or more decoders, information of the manipulated objects based on the second region.

FIG. 9 illustrates another example process 900 to scan structured identifier by identifying manipulated objects, according to at least one embodiment. Although process 900 is depicted as a series of steps or operations, it will be appreciated that at least one embodiment of process 900 includes altered or reordered steps or operations, or omits certain steps or operations, except where explicitly noted or logically required, such as when an output of one step or operation is used as input for another. One or more entities described in conjunction with FIGS. 1, 2, and 4-7, singly or in any combination, perform each block of process 900. For example, the one or more entities may include computer system 102, image processor 232, manipulated item detection module 234, identifier detection module 236, robot controller 238, neural network 400, first neural networks 612, second neural networks 614, barcode decoder 616, first neural networks 712, second neural networks 714, and barcode decoder 716. The one or more entities may further include, for example, one or more of hardware, firmware, and/or software described in conjunction with FIG. 2.

Various functions can be carried out by a processor executing instructions stored in memory (e.g., computer readable, machine readable) to perform process 900. Also, process 900 may be implemented as computer-usable instructions (e.g., macro instruction, micro-instruction) stored on computer storage media or provided by a stand-alone application, a service or hosted service (standalone or in combination with another hosted service).

At block 902, the one or more entities may capture images that depict two or more objects. The one or more entities may use a single camera to capture images of two or more objects sequentially over time. Alternatively, the one or more entities may use multiple cameras to simultaneously capture images of the objects from various viewpoints. Additionally, a single mobile camera, such as a rotating one, may be used by the one or more entities to photograph two or more objects from different angles.

At block 904, the one or more entities may determine if the quality of the images is good enough to recognize the two or more objects, process 900 may move to block 906. If not, process 900 moves to block 902 to receive additional images that accurately depict the two or more images.

At block 906, the one or more entities may identify, using one or more first neural networks, a first region in the images that includes at least one manipulated object from the two or more objects.

At block 908, the one or more entities may generate, using one or more first neural networks, data indicating the first region within the images. The one or more entities may use one or more first neural networks to determine which image, among several, should be used for data generation. This decision may hinge on the depiction of the manipulated object within the images. Alternatively, the one or more entities can generate data for all images. This data may include assigning labels to each pixel of the selected image. For instance, the manipulated object can be labeled with one color, while other pixels (such as the background or unrelated image elements) are labeled with a different color. Another approach may include applying segmentation masks, where binary masks could be used: a value of 0 could indicate the background or unrelated image information, and a value of 1 could denote the object of interest (such as the manipulated object) or foreground.

At block 910, the one or more entities may identify, using one or more second neural networks, two or more second regions within the one or more images, where the two or more second regions include structured identifiers of the objects.

At block 912, the one or more entities may obtain, using one or more decoders, information of the manipulated object. In some examples, the one or more entities may select candidate barcode regions using the data indicating the first regions and the second regions that include structured identifiers of the objects.

Figure 10:
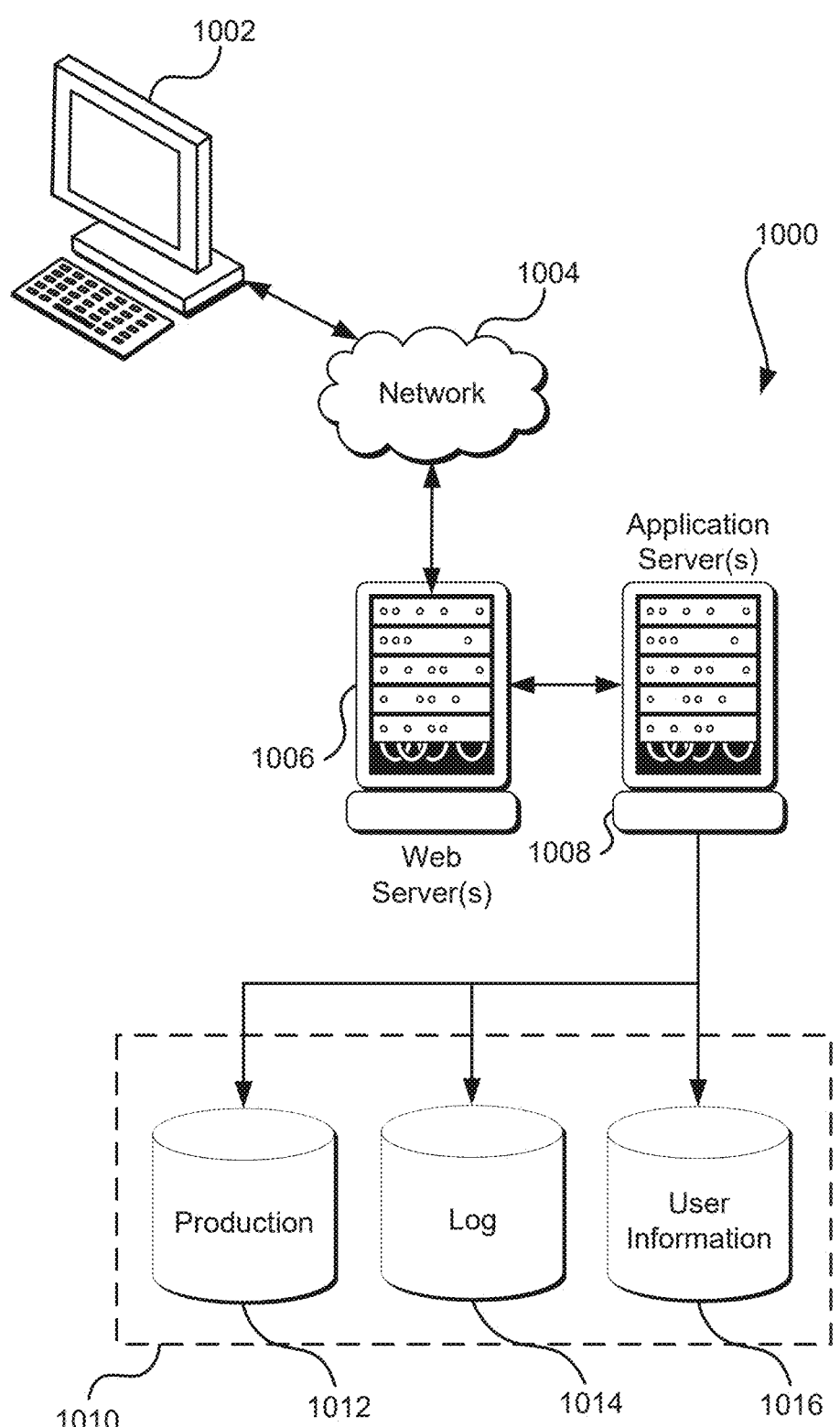
FIG. 10 illustrates a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software, and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1002 and the application server 1008, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update, or otherwise process data in response thereto, and the application server 1008 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1002. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C #or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

At least one embodiment of the disclosure can be described in view of the following clauses:

1. A computer-implemented method, comprising:
   generating a plurality of images comprising a plurality of objects using a plurality of image sensors, wherein each of the plurality of objects comprises different structured identifiers;
   generating, using one or more first neural networks, one or more binary segmentation masks that correspond to an object of interest of the plurality of objects, wherein the object of interest is located differently within the plurality of images;
   identifying, using one or more second neural networks, a structured identifier within the object of interest based, at least in part, on the one or more binary segmentation masks; and
   identifying, using one or more decoders, information associated with the object of interest based, at least in part, on the structured identifier.

2. The computer-implemented method of clause 1, wherein generating the plurality of images further comprises:

generating one or more control signals that cause a robot to pick the object of interest; and causing the plurality of image sensors to capture the plurality of images while the robot is picking the object of interest.

3. The computer-implemented method of clause 1 or 2, wherein the one or more first neural network comprises U-Net and EfficientNet.

4. The computer-implemented method of any of clauses 1-3, further comprising: generating one or more control signals that cause a robot to place a container in a different location as a result of determining that the object of interest is placed inside the container.

5. A system, comprising:

one or more processors;

memory that stores computer-executable instructions that, if executed, cause the one or more processors to:

receive two or more images that depict two or more objects;

select, using a first neural network, an object of interest from the two or more objects;

generate one or more indications of the object of interest;

identify, using a second neural network, two or more structured identifiers based, at least in part, on the two or more images; and select a structured identifier from the two or more structured identifiers associated with the object of interest based, at least in part, on the one or more indications.

6. The system of clause 5, wherein the computer-executable instructions further comprise computer-executable instructions that, if executed by the one or more processors, cause the system to determine, using one or more decoders, data specific to the object of interest based, at least in part, on the structured identifier.

7. The system of clause 5 or 6, wherein the computer-executable instructions that cause the system to identify the two or more structured identifiers further comprise computer-executable instructions that, if executed by the one or more processors, cause the system to generate bounding boxes to annotate the two or more structured identifiers using the second neural network.

8. The system of any of clauses 5-7, wherein the one or more indications comprise one or more binary segmentation masks.

9. The system of any of clauses 5-8, wherein the computer-executable instructions that cause the system to select the structured identifier further comprise computer-executable instructions that, if executed by the one or more processors, cause the system to determine a candidate region that includes the structured identifier using the one or more indications and two or more regions including two or more structured identifiers.

10. The system of any of clauses 5-9, wherein the two or more images comprise sequential images captured over a period of time, wherein temporal information is embedded within the two or more images.

11. The system of any of clauses 5-10, wherein the two or more images captures rotation or flipping of the object of interest.

12. The system of any of clauses 5-11, wherein the first neural network comprises one or more convolutional layers.

13. A non-transitory computer-readable storage medium storing thereon executable instructions that, as a result of being executed by one or more processors of a computer system, cause the computer system to at least:

obtain an image that includes a plurality of objects that corresponds to distinct structured identifiers;

generate, using one or more neural networks, one or more indications of an object of interest of the plurality of objects;

determine, using the one or more neural networks, a structured identifier that corresponds to the object of interest; and generate data associated with the object of interest based, at least in part, on the structured identifier.

14. The non-transitory computer-readable storage medium of clause 13, wherein the one or more indications comprise one or more embedded features usable by the one or more neural networks to determine the structured identifier.

15. The non-transitory computer-readable storage medium of clause 13 or 14, wherein the instructions further comprise instructions that, as a result of being executed by the one or more processors, cause the computer system to generate one or more one or more control signals that cause a robot to place a container to a different location as a result of determining that the object of interest is placed inside the container.

16. The non-transitory computer-readable storage medium of any of clauses 13-15, wherein the instructions further comprise instructions that, as a result of being executed by the one or more processors, cause the computer system to obtain a plurality of images of at least one of the plurality of objects captured over a period of time, wherein the plurality of images is usable by the one or more neural networks to generate the one or more indications.

17. The non-transitory computer-readable storage medium of any of clauses 13-16, wherein the instructions further comprise instructions that, as a result of being executed by the one or more processors, cause the computer system to use one or more other neural networks to generate training data to update the one or more neural networks, wherein the training data comprises one or more segmentation masks.

18. The non-transitory computer-readable storage medium of any of clauses 13-17, wherein the instructions that causes the computer system to generate the data further comprise instructions that, as a result of being executed by the one or more processors, cause the computer system to use a barcode decoder to generate the data based, at least in part, on the structured identifier.

19. The non-transitory computer-readable storage medium of any of clauses 13-18, wherein the plurality of images capture rotation or flipping of an object of interest.

20. The non-transitory computer-readable storage medium of any of clauses 13-19, wherein the structured identifier comprises one-dimensional (1D) barcode or two-dimensional (2D) barcode.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

The invention claimed is:

1. A computer-implemented method, comprising:
generating a plurality of images comprising a plurality of objects using a plurality of image sensors, wherein each of the plurality of objects comprises different structured identifiers;
generating, using one or more first neural networks, one or more binary segmentation masks that correspond to an object of interest of the plurality of objects, wherein the object of interest is located differently within the plurality of images;
identifying, using one or more second neural networks, a structured identifier within the object of interest based, at least in part, on the one or more binary segmentation masks; and
identifying, using one or more decoders, information associated with the object of interest based, at least in part, on the structured identifier.

2. The computer-implemented method of claim 1, wherein generating the plurality of images further comprises:
generating one or more control signals that cause a robot to pick the object of interest; and
causing the plurality of image sensors to capture the plurality of images while the robot is picking the object of interest.

3. The computer-implemented method of claim 1, wherein the one or more first neural network comprises U-Net and EfficientNet.

4. The computer-implemented method of claim 1, further comprising:
generating one or more control signals that cause a robot to place a container in a different location as a result of determining that the object of interest is placed inside the container.

5. A system, comprising:
one or more processors;
memory that stores computer-executable instructions that, if executed, cause the one or more processors to:
receive two or more images that depict two or more objects;
select, using a first neural network, an object of interest from the two or more objects;
generate one or more indications of the object of interest;
identify, using a second neural network, two or more structured identifiers based, at least in part, on the two or more images; and
select a structured identifier from the two or more structured identifiers associated with the object of interest based, at least in part, on the one or more indications.

6. The system of claim 5, wherein the computer-executable instructions further comprise computer-executable instructions that, if executed by the one or more processors, cause the system to determine, using one or more decoders, data specific to the object of interest based, at least in part, on the structured identifier.

7. The system of claim 5, wherein the computer-executable instructions that cause the system to identify the two or more structured identifiers further comprise computer-executable instructions that, if executed by the one or more processors, cause the system to generate bounding boxes to annotate the two or more structured identifiers using the second neural network.

8. The system of claim 5, wherein the one or more indications comprise one or more binary segmentation masks.

9. The system of claim 5, wherein the computer-executable instructions that cause the system to select the structured identifier further comprise computer-executable instructions that, if executed by the one or more processors, cause the system to determine a candidate region that includes the structured identifier using the one or more indications and two or more regions including two or more structured identifiers.

10. The system of claim 5, wherein the two or more images comprise sequential images captured over a period of time, wherein temporal information is embedded within the two or more images.

11. The system of claim 5, wherein the two or more images captures rotation or flipping of the object of interest.

12. The system of claim 5, wherein the first neural network comprises one or more convolutional layers.

13. A non-transitory computer-readable storage medium storing thereon executable instructions that, as a result of being executed by one or more processors of a computer system, cause the computer system to at least:
obtain an image that includes a plurality of objects that corresponds to distinct structured identifiers;
generate, using one or more neural networks, one or more indications of an object of interest of the plurality of objects;
determine, using the one or more neural networks, a structured identifier that corresponds to the object of interest; and
generate data associated with the object of interest based, at least in part, on the structured identifier.

14. The non-transitory computer-readable storage medium of claim 13, wherein the one or more indications comprise one or more embedded features usable by the one or more neural networks to determine the structured identifier.

15. The non-transitory computer-readable storage medium of claim 13, wherein the instructions further comprise instructions that, as a result of being executed by the one or more processors, cause the computer system to generate one or more one or more control signals that cause a robot to place a container to a different location as a result of determining that the object of interest is placed inside the container.

16. The non-transitory computer-readable storage medium of claim 13, wherein the instructions further comprise instructions that, as a result of being executed by the one or more processors, cause the computer system to obtain a plurality of images of at least one of the plurality of objects captured over a period of time, wherein the plurality of images is usable by the one or more neural networks to generate the one or more indications.

17. The non-transitory computer-readable storage medium of claim 13, wherein the instructions further comprise instructions that, as a result of being executed by the one or more processors, cause the computer system to use one or more other neural networks to generate training data to update the one or more neural networks, wherein the training data comprises one or more segmentation masks.

18. The non-transitory computer-readable storage medium of claim 13, wherein the instructions that causes the computer system to generate the data further comprise instructions that, as a result of being executed by the one or more processors, cause the computer system to use a barcode decoder to generate the data based, at least in part, on the structured identifier.

19. The non-transitory computer-readable storage medium of claim 13, wherein the plurality of images capture rotation or flipping of an object of interest.

20. The non-transitory computer-readable storage medium of claim 13, wherein the structured identifier comprises one-dimensional (1D) barcode or two-dimensional (2D) barcode.

\* \* \* \* \*